United States Patent [19]

Maruyama

[11] 4,408,966

[45] Oct. 11, 1983

[54] PUMP FOR SUPPLYING LIQUID FUEL

[75] Inventor: Teruo Maruyama, Neyagawa, Japan

[73] Assignee: Matsushita Electric Industrial Co., Ltd., Osaka, Japan

[21] Appl. No.: 218,305

[22] Filed: Dec. 19, 1980

[30] Foreign Application Priority Data

Dec. 27, 1979 [JP] Japan ................................ 54-172941

[51] Int. Cl.³ ......................... F04B 35/04; F01D 1/36; H02K 1/22

[52] U.S. Cl. .................................... 417/356; 417/420; 415/90; 310/268

[58] Field of Search ......................... 415/90, 80, 199.1; 417/355, 356, 410, 423 R, 420; 310/268

[56] References Cited

U.S. PATENT DOCUMENTS

| | | | |
|---|---|---|---|
| 3,575,536 | 4/1971 | Jacobs | 417/420 |
| 3,781,136 | 12/1973 | Jacobson | 415/90 X |
| 3,794,449 | 2/1974 | Brouwer | 415/90 |
| 3,870,433 | 4/1975 | Raikov et al. . | |
| 3,932,069 | 1/1976 | Giardini et al. | 310/268 X |
| 4,171,182 | 10/1979 | Feres | 415/90 |

FOREIGN PATENT DOCUMENTS 53-18724 6/1978 Japan .

*Primary Examiner*—Carlton R. Croyle
*Assistant Examiner*—Peter M. Cuomo
*Attorney, Agent, or Firm*—Joseph W. Farley

[57] ABSTRACT

A pump for forcedly feeding kerosene or like fluid comprises a rotor, a housing rotatably accommodating the rotor, a stator for forming a rotary magnetic field to rotate the rotor, and a fluid feeding portion. When the rotor is a disk, spiral grooves providing the feeding portion are formed in the rotor and/or a housing wall opposed to the rotor. When the rotor is tubular, a helical groove or grooves are formed in the outer surface of a fixed shaft serving as part of the housing and/or in the inner peripheral surface of the rotor to provide the feeding portion. The pump properly feeds the fluid at widely varying flow rates including a very small rate free of any leak and without producing a loud noise. The pump, including a motor as a component, is compact, thin and simple in construction.

10 Claims, 12 Drawing Figures

PUMP FOR SUPPLYING LIQUID FUEL

This invention relates to a pump for forcedly feeding a liquid, such as kerosene, to burners and like combustion apparatus.

Free piston electromagnetic pumps of the pulse modulation type have heretofore been used for feeding a fuel to combustion apparatus such as burners. The electromagnetic pump comprises a hollow cylindrical solenoid coil and a plunger disposed inside the coil and adapted to reciprocate intermittently to feed the fuel at a rate of about 5 to 7 cc/min when the coil is energized with a current subjected to pulse width modulation.

Typical of burners for burning fuels are rotary gasifying burners in which the fuel supplied to a rotor is centrifugally atomized by the rotor and gasified in a vaporizing cylinder to prepare a fuel-gas mixture, and the mixture is burned. While such burners are widely used for forced air heaters of the FF type recently, the electromagnetic pump described above has become in recent years no longer satisfactorily serviceable for such air heaters, i.e. for the rotary gasifying burners incorporated therein, because with the wide use of air heaters, it is desired that the burner should fulfill the following requirements.

(1) To heat the space properly through more accurate temperature control or to assure savings in energy, the amount of combustion must be made variable over a wider range.

(2) Preferably the fuel for the burner, e.g. kerosene, should feed a pilot flame. The burner is then usable, for example, for ranges and will find winder use.

To meet the requirement (1), the feed of fuel from the pump to the burner, which is presently about 5 to 7 cc/min, must be made variable over a wider range of from about 2 cc/min (heat output: about 1000 Kcal) to about 7 cc/min (heat output: about 3500 Kcal). Thus the minimum flow rate of the pump should be up to about $\frac{1}{3}$ the maximum flow rate thereof.

Suppose the plunger is driven at a pulse frequency of 10 Hz to achieve a flow rate of 7 cc/min, the single stroke of the plunger should give an output of $$\frac{7 \text{ cc/min}}{10} \approx \frac{0.12 \text{ cc/sec}}{10} = 0.012 \text{ cc}$$

Thus the pulse width modulation system involves limitations in accuracy even when the flow rate is variable from 5 cc/min to 7 cc/min. It is therefore difficult to provide the variable flow range of from 2 to 7 cc/min. Still greater difficulties are encountered in filfilling the requirement (2) since the flow rate must be reduced to a lower value of up to 0.2 cc/min.

The pump in which a plunger reciprocates has another drawback that it produces a loud noise.

To overcome the foregoing drawbacks of the plunger pump, a pump has been recently developed which includes a rotor rotatably provided in a housing and partly projecting from the housing. However, since the rotor is driven by the torque delivered to the projection from a motor, the projection must be of liquid-tight construction. The pump therefore has the drawbacks of being complex in structure and prone to leaks if imperfectly sealed off.

In view of the above drawbacks, the main object of the present invention is to provie a pump which is capable of feeding a very small flow of fluid accurately without giving off a loud noise and without permitting any leak.

To achieve this object, this invention provides a pump comprising housing means having an inlet and an outlet for a fluid, a rotor rotatably disposed within the housing means, a stator for magnetically rotating the rotor and a fluid feeding portion formed on at least one of the rotor and a wall of the housing means opposed to the rotor.

With the pump of this invention, the rotor is magnetically rotated by the stator to cause the feeding portion to pump a fluid, so that the fluid can be fed to the desired apparatus accurately at any rate over a wide range of flow rates including a very low rate when the speed of rotation of the rotor is altered. The present pump, which does not include a reciprocating plunger, is operable very quietly unlike conventional pumps, while there is no need to form a bore in the housing for receiving the rotor drive shaft or like projection heretofore necessary, consequently eliminating the necessity of providing a liquid-tight construction for such projection. Accordingly the pump can be correspondingly simplified in structure and is free of leaks and damage due to wear at the above-mentioned projection.

Further according to this invention, the rotor during rotation is supported by a fluid bearing provided by the feeding portion and the fluid flowing along this portion and is therefore held out of contact with the housing wall to be free of any abrasion.

Other features and advantages of the present invention will become apparent from the following embodiments described with reference to the accompanying drawings, in which:

FIG. 1 is a side elevation in vertical section showing an embodiment of the invention;

FIGS. 2*a* and 2*b* are front views showing spiral grooves formed in the rotor and housing plate of FIG. 1 respectively;

Figure 5:
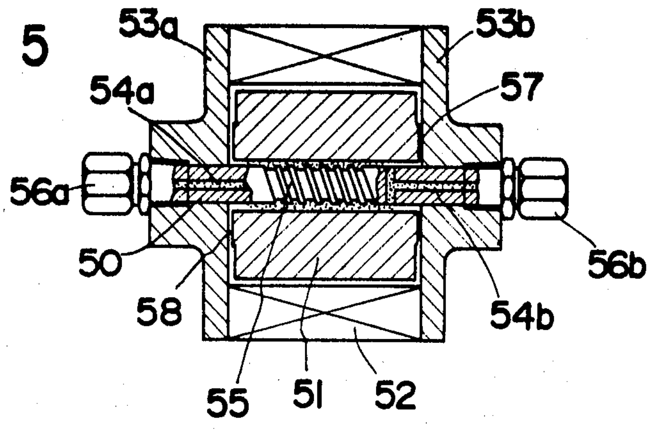
FIG. 5 is a side elevation in vertical section showing another embodiment of the invention.
Figure 6A:
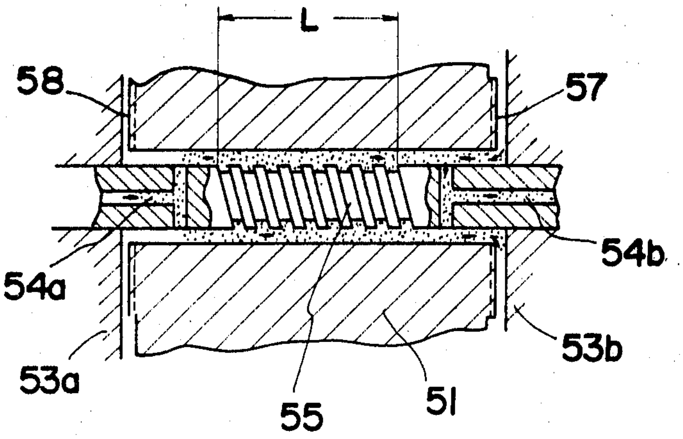
Figure 6B:
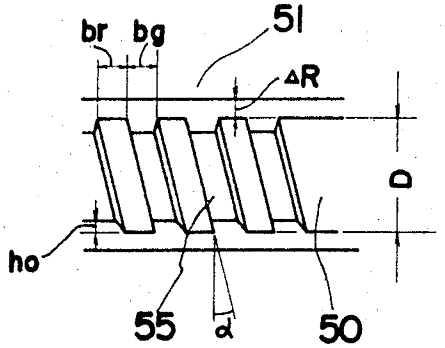
Figure 7:
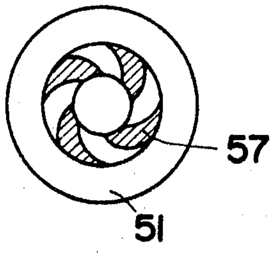
Figure 8A:
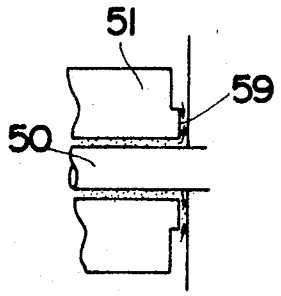
Figure 8B:
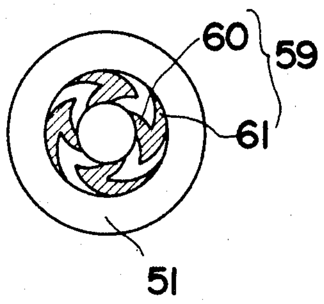
Figure 9:
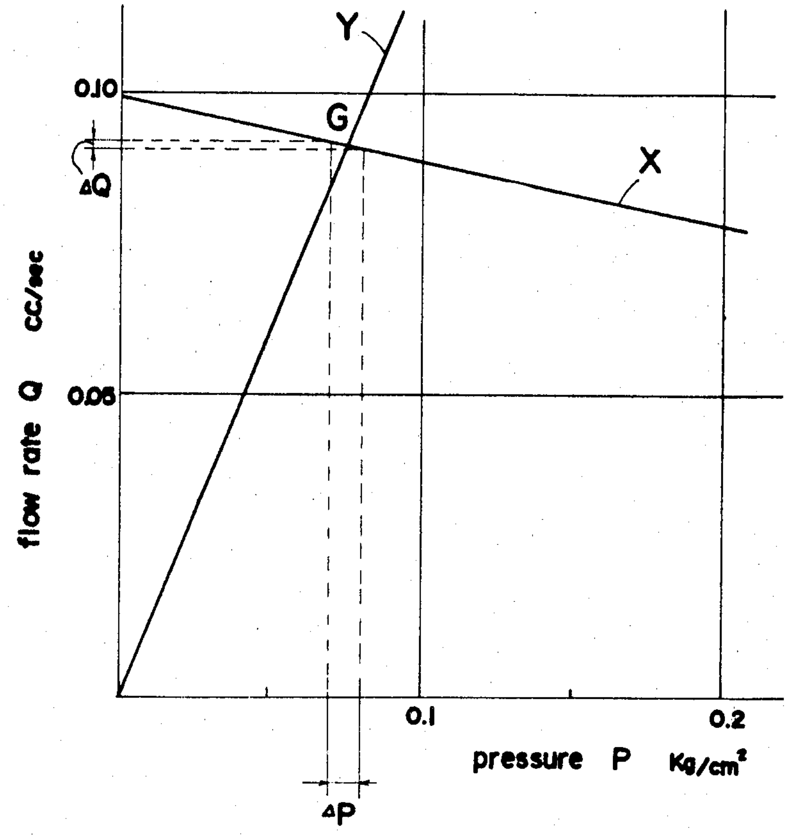

FIGS. 6*a* and 6*b* are fragmentary enlarged views of FIG. 5;

FIG. 7 is a front view showing spiral grooves formed in one side of the rotor shown in FIG. 5;

FIGS. 8*a* and 8*b* are a side elevation and a front view, respectively, showing a modification of the spiral grooves of FIG. 7; and FIG. 9 is a diagram showing the pressure-flow rate characteristics of the pump of FIG. 5 as adapted to have constant flow rate characteristics.

Figure 1:
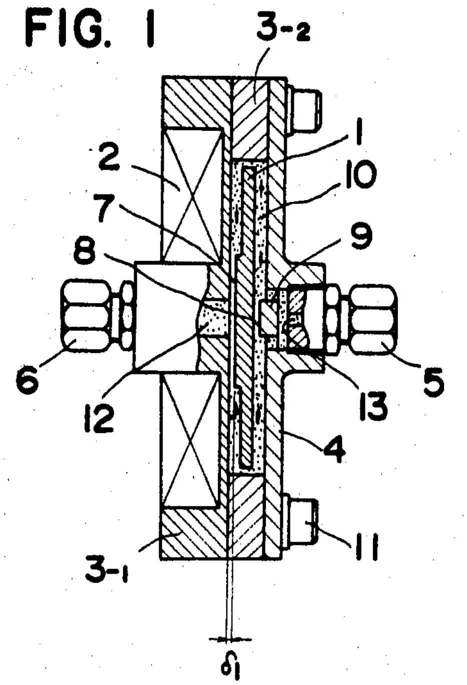
Figure 3:
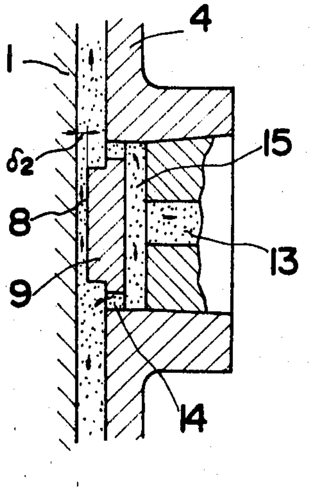
FIG. 3 is a fragmentary enlarged view of FIG. 1.

With reference to FIGS. 1 to 3, a first embodiment will be described which is a pump for feeding a fuel to a rotary gasifying burner or like combustion apparatus.

Figure 2A:
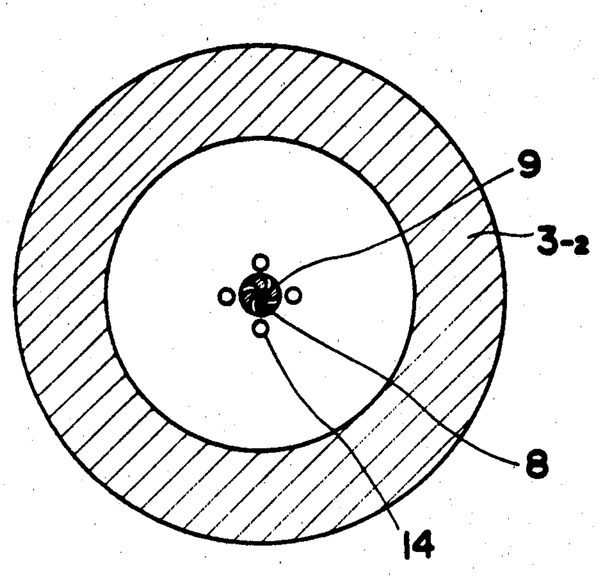
Figure 2B:
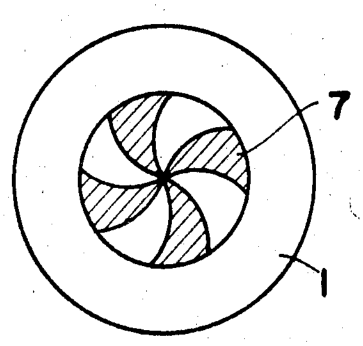

FIG. 1 shows a rotor 1 in the form of a disk and a stator 2 comprising an annular electromagnetic coil. The rotor 1 is rotatably accommodated in housing means comprising a housing member 3-1, a housing ring 3-2 and a housing plate 4 which are fastened together with bolts 11. With the present embodiment, the housing member 3-1 serves also to house the stator 2, while the housing plate 4 serves also as a cover plate. As seen in FIG. 2*b*, a fluid feeding portion 7 to forcibly feed a fluid comprises spiral grooves formed in the left side surface of the rotor 1. The housing plate 4 has a central projection 9 which is formed with spiral grooves 8 as shown in FIG. 2a. With the rotation of the rotor 1, the spiral grooves 7 also rotate, producing a pumping action to forcedly feed the fluid (kerosene) 10. An outlet channel 12 and an inlet channel 13 for the fluid are in communication with pipe couplings 6 and 5 respectively.

With the present embodiment, the stator 2 (primary element: coil) and the rotor 1 (secondary element: conductor) oppose each other side by side to constitute an induction motor. Stated more specifically, the stator 2 sets up a rotary magnetic field, which produces an eddy current on the surface of the rotor 1, namely the secondary element conductor. The magnetic field and the eddy current on the rotor 1 coact to produce a continuous thrust (torque) in accordance with Fleming's rule of the left hand. To enable the rotor 1 to effectively generate an eddy current, the housing member 3-1 and the housing ring 3-2 are made from a resin which is a nonconductor. The housing member 3-1 and the housing ring 3-2 are separate pieces so that these parts can be made with improved dimensional accuracy.

In addition to the torque resulting from the electromagnetic induction, a perpendicular force acts between the rotor 1 in rotation and the stator 2. The pumping action of the spiral grooves 7 in the rotor 1 produces a pressure between the inner wall surface of the housing member 3-1 and the front surface of the rotor (where the grooves 7 are formed). The pumping action of the spiral grooves 8 also produces a pressure between the grooved surface of the projection 9 and the rear surface of the rotor 1. These three forces or pressures maintain an equilibrium, by which the axial movement of the rotor 1 is restrained. At this time, that is, while the rotor 1 is in rotation, a fluid bearing is formed which retains the rotor 1 in position. FIG. 2a is a front view showing the spiral grooves 8 formed in the projection 9 of small diameter. The grooves and ridges are formed symmetrically with respect to a point. The grooves are shown as hatched portions.

FIG. 2b is a front view showing the spiral grooves 7 for pumping the fluid. Similarly the grooves and ridges are formed as arranged alternately in the circumferential direction.

Since the projection 9 formed with the spiral grooves 8 has a small outside diameter, the grooves 8 produce a great pressure on the fluid only when the clearance $\delta_2$ shown in FIG. 3 is small, whereas the feeding portion provided by the spiral grooves 7 has a much larger outside diameter than the projection 9, so that the characteristics of the pressure produced by the grooves 7 are not sensitive to variations in the clearance $\delta_1$ shown in FIG. 1. Furthermore, the electromagnetic force produced between the stator 2 and the rotor 1 by electromagnetic induction is less sensitive to the axial movement of the rotor 1 than the fluid pressure acting as the fluid bearing. Within the range of the clearances $\delta_1$ and $\delta_2$, therefore, the magnetic force can be regarded as almost uniform.

Figure 4:
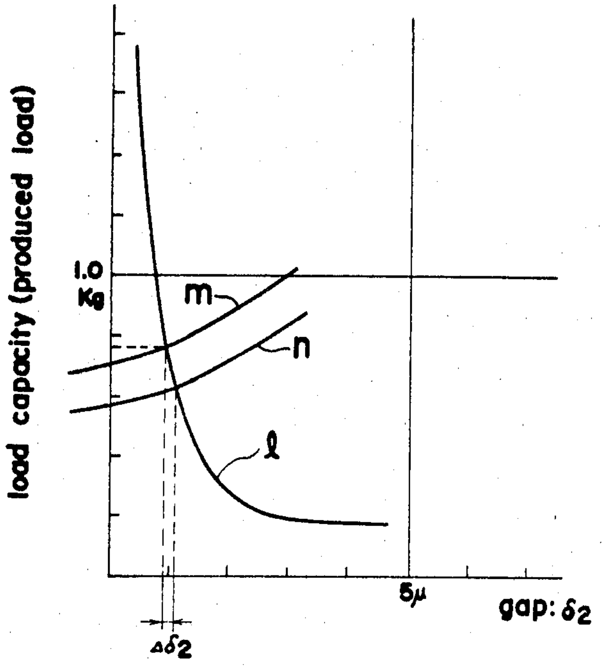
FIG. 4 is a diagram showing the load capacity (produced load) characteristics of the spiral grooves formed in the rotor and housing plate.

FIG. 4 shows the clearance $\delta_2$ dependent on the balance of the foregoing forces. Line l represents the load capacity characteristics (produced load characteristics) of the spiral grooves 8 relative to the clearance $\delta_2$. Line m represents the load capacity (produced load) of the spiral grooves 7 plus the perpendicular force due to magnetic induction, relative to the clearance $\delta_1$ which is dependent on the clearance $\delta_2$. Line m is curved upward toward the right since the larger the clearance $\delta_2$, the smaller is the clearance $\delta_1$. The position of the rotor 1 in rotation is given by the intersection between Line l and Line m.

FIG. 4 reveals that while the rotor 1 is in rotation, a very small clearance $\delta_2$ of about $1\mu$ is maintained between the rear surface of the rotor 1 and the projection 9 on the housing plate 4. It therefore follows that the clearance $\delta_1$ between the rotor 1 formed with the spiral groove 7 and the housing member 3-1 remains constant at all times. (In the illustrated embodiment, for example, $\delta_1$ is $10\mu$.) Furthermore even when the variation in the viscosity of kerosene due to a temperature variation alters the pressure produced by the spiral grooves 7, consequently altering the load capacity characteristics thereof from Line m to Line n, the resulting variation in the clearance $\delta_2$ is very slight as indicated by $\Delta\delta_2$.

FIG. 3 is an enlarged view showing the inlet channel 13 formed in the housing plate 4, four flow bores 14 (also see FIG. 2a) formed around the spiral grooves 8, and an oil pool 15. The fluid from the oil pool 15 is caused to flow as indicated by arrows in FIG. 3 by the spiral grooves and the rotation of the rotor 1. The overall flow of the fluid will be apparent from FIG. 3 in combination with FIG. 1.

The pump of this invention is characterized by the integral construction of an electric motor and a rotary pump for forcedly feeding a fluid. Stated specifically the rotor 1 provided with means (e.g. the spiral grooves 7) for forcedly feeding the fluid is directly given electromagnetic torque from outside. Because of this arrangement, the pump of the invention has various novel features. With the present embodiment, the rotor 1 (motor secondary element), a conductor, which is formed with spiral grooves 7 and the stator 2 (motor primary element) disposed outside thereof side by side constitute an induction motor. Accordingly the pump in its entirety is very simple in construction, thin and compact.

Further with the present embodiment, the spiral grooves 7 act to provide a fluid bearing for supporting the rotor 1, so that the rotor 1 can be mechanically held out of contact with the inner wall surfaces of the housing means (3-1, 3-2, 4) during rotation. Consequently the pump is operable quietly free of noises and suffers no wear since the pump includes no mechanically sliding portion.

Conventional plunger pumps have the problem of permitting leaks in delicately varying amounts in accordance with the state of the plunger fitting in its housing and consequently possessing varying flow rate characteristics. Additionally plunger pumps, gear pumps, vane pumps, etc., which invariably include mechanical sliding portions for sealing off the pressure chamber, are subject to deformation due to wear on the sliding portions when used for a prolonged period of time, with the resulting problem that the deformation produces variations in output pressure and flow rate characteristics.

With the present embodiment, the clearances $\delta_1$ and $\delta_2$ between the rotor 1 and the opposed wall surfaces are dependent on the pressure of the films produced by the spiral grooves 7 and 8, so that even after the pump is used for a prolonged period of time, no variation occurs in the clearance $\delta_1$ which seriously influences the pumping characteristics, permitting the pump to retain the desired characteristics steadily.

According to the embodiment described above, the combination of the spiral grooves 7 and 8 which differ greatly in load capacity characteristics (produced load characteristics) relative to the clearances $\delta_1$ and $\delta_2$ enables the clearance $\delta_1$ to remain constant at all times.

However, for uses in which highly accurate flow rates are not required, the pumping spiral grooves 7 only may be formed in one surface of the rotor 1, with the other surface of the rotor 1 adapted to be supported by balls. In this case, accurate flow rates are not available due to errors involved in the installation of the balls on the projection 9 and also errors resulting from the wear of the balls in sliding contact with the rotor 1. In either case, the spiral grooves 7 can be formed in the wall surface of the housing member 3-1 or housing plate 4 opposed to the rotor 1.

A second embodiment of the present invention will now be described with refeence to FIGS. 5 to 7. The second embodiment differs from the first in that the rotor and the stator, which are arranged side by side in the first embodiment, are in a double tube arrangement or are radially opposed to each other for providing a motor.

FIG. 5 shows a tubular rotor 51, a fixed shaft 50, a tubular stator 52 and housing plates 53*a*, 53*b*. According to the second embodiment, the fixed shaft 50, the stator 52 and the housing plates 53*a*, 53*b* provide housing means having a doughnut-shaped space in its interior. The tubular rotor 51 is accommodated in the housing means and is rotatable about the shaft 50 which is fixed at its opposite ends to the housing plates 53*a*, 53*b*. The fixed shaft 50 has an inlet channel 54*a* and an outlet channel 54*b* which are formed centrally thereof for passing a fluid. The fixed shaft 50 is formed in its outer surface with a helical groove or grooves 55 providing a fluid feeding portion. More specifically stated, the fluid is forcedly fed by the rotation of the inner peripheral surface of the rotor 51 relative to the helical groove(s) 55. Indicated at 56*a*, 56*b* are pipe couplings for supplying the fluid, and at 57, 58 spiral grooves formed in right and left side projections on the rotor 51 for preventing the outflow of the fluid.

With conventional screw pumps or like pumps which comprise a pump main body and a drive assembly (motor) separate therefrom, there is the need to mechanically accurately maintain a uniform clearance between the rotary member and another member opposed thereto, whereas with the present embodiment, the helical groove or grooves 55 act to produce a fluid pressure by which the rotor 51 is automatically aligned with the fixed shaft 50, forming a uniform clearance ΔR around the shaft 50 as shown in FIG. 6*b*. Accordingly stable output pressure and flow rate characteristics are available at all times. It is to be noted that the helical groove(s) 55 and the pressurized fluid thereby formed provide a fluid bearing for supporting the rotor 51.

The spiral grooves 57 and 58 are formed on the opposite side projections on the rotor 51 for preventing the fluid from flowing out into portions other than the clearance (fluid passageway) formed between the inner surface of the rotor 51 and the grooved surface of the shaft 50. For example, the spiral grooves 57 on the outlet side act to return the fluid toward the axis of the rotor 51 as shown in FIG. 6*a*. At the same time, the spiral grooves 57, 58 serve to restrain the axial movement of the rotor 51 with the fluid pressure produced by the rotation of the rotor. FIG. 7 shows the shape of the spiral grooves 57.

Instead of the grooves shown in FIG. 7 which are curved only in one direction (i.e. in a direction to force the fluid inward) to provide a thrust bearing for confining the fluid to the fluid passageway and restraining the axial movement of the rotor 51, herringbone grooves 59 as shown in FIG. 8*b* may be formed in the opposite side projections of the rotor 51 or in the walls opposed thereto, whereby the rotor can be supported more effectively axially thereof.

With reference to FIG. 8*b*, indicated at 61 are outer grooves, and at 60 inner grooves. Unlike the grooves 57 shown in FIG. 7, the inner grooves 60 function to force the fluid outward (centrifugally), with the result that the fluid between the inner surface of the rotor 51 and the fixed shaft 50 is drawn by the inner grooves 60 into the spaces between the grooved projections of the rotor and the walls opposed thereto. However, the outer grooves 61, like the grooves 57, act to force the fluid inward (toward the fixed shaft 50) and prevent the fluid from flowing out from the passageway. Consequently the grooves 60, 61 act to supply to the side faces of the rotor 51 a suitable portion of the fluid (e.g. kerosene) as a lubricant for axially supporting the rotor 51 without permitting substantial outflow of the fluid from the flow passageway.

Although the characteristics required of the pump vary with the contemplated use, the grooves 7 or 55, when suitably altered in shape, afford the desired characteristics for forcibly feeding the fluid, for either of the side-by-side type and the radially opposed type.

With reference to FIG. 6*b*, it is now assumed that the clearance between the ridge(s) of the feeding portion provided by the helical groove(s) 55 and the inner surface of the rotor 51 is ΔR, the width of the groove 55 bg, the width of the ridge br, the depth of the groove ho, and the angle of inclination of the groove with respect to a vertical line $\alpha$. When these parameters are varied, the pump characteristics generally alter as follows.

TABLE 1

| Parameter | Pump characteristics | |
|---|---|---|
| | Constant flow rate | Constant output pressure |
| ΔR | Small | Large |
| bg/br | Small | Large |
| ho/ΔR | Small | Large |
| $\alpha$ | Small | Large |

Table 1 shows that when the parameters ΔR, bg/br, ho/ΔR and $\alpha$ are small, the pump has constant flow rate characteristics and that when these parameters are all large, the pump has constant output pressure characteristics.

When the pump of this invention is to be used for feeding a fuel to a rotary gasifying burner, the pump is preferably of constant flow rate characteristics, in which case it is less subject to the influence of the back pressure characteristics of the burner relative to load variations of the burner.

Table 2 shows the particulars of a pump adapted to have constant flow rate characteristics.

TABLE 2

| Parameter | Symbol | Embodiment |
|---|---|---|
| Diameter of shaft 50 | D | 0.8 cm |
| Length of feeding portion | L | 4.0 cm |
| Inclination angle of groove 55 | $\alpha$ | 40° |
| Width of groove 55 | bg | 0.3 cm |
| Width of rige | br | 0.1 cm |
| Clearance | ΔR | 10μ |
| Depth of groove 55 | ho | 30μ |
| Speed of rotation of rotor 51 | $\omega$ | 1800 r.p.m |

TABLE 2-continued

| Parameter | Symbol | Embodiment |
| --- | --- | --- |
| Coefficient of viscosity | n | 1.2 cst |

FIG. 9 shows the characteristics of the pump having the construction shown in FIG. 5 and the parameters listed in Table 2. With reference to FIG. 9, Line X represents the pressure-flow rate characteristics of the pump. Line Y represents the back pressure characteristics of the burner as determined at the outlet of the pump. The operating point G of the pump is given by the intersection of Lines X and Y.

When the state of combustion of the burner changes if delicately, the back pressure of the burner also varies. When the back pressure variation, $\Delta P$, is 10 mm Aq, the resulting variation in the flow rate, $\Delta Q$, is 0.000105 cc/sec. This value is 0.12% of the flow rate Q of 0.09 cc/sec (i.e. 5.4 cc/min) at the point G. Since the irregularities in the rotation of the induction motor are as small as about 0.1%, the helical groove(s) 55, when adapted to afford constant feeding rate characteristics, provide a pump having highly accurate flow rate characteristics.

The pumps according to the two embodiments described above are well-suited for feeding kerosene to rotary gasifying burners, fan heaters, ranges, etc. When the rotors 1 and 51 are driven at varying speeds for controlling the flow rate, the combustion of fuel is controllable over a wide range with high accuracy. Since the rotors are rotatable free of contact with any mechanical part, the pumps are useful also for the voice coils of loudspeakers for circulating a coolant with a reduced noise.

What is claimed is:

1. A pump comprising housing means providing a rotor accomodating space and having an inlet channel and outlet channel arranged substantially on the axis of the rotor accomodating space in communication therewith for the passage of a fluid;

a shaftless rotor completely and rotatably accomodated within the rotor accomodating space;

a stator for magnetically rotating the rotor within the rotor accomodating space; and groove means formed on at least one of the surfaces of the rotor and the surfaces of the rotor housing means, whereby when the rotor is magnetically rotated by the stator, the fluid is forced forward by the groove means, the rotor being radially and axially supported in the rotor accomodating space solely by a fluid bearing provided by the fluid and the groove means.

2. A pump as defined in claim 1 wherein the rotor is provided in the form of a disc.

3. A pump as defined in claim 2 wherein the stator is disposed in opposed relation to the discal rotor.

4. A pump as defined in claim 2 wherein the groove means comprises equiangularly spaced spiral grooves formed on a surface of the rotor accomodating space opposed to one side surface of the discal rotor and extending radially outward from the axis of the rotor accomodating space.

5. A pump as defined in claim 2 wherein the surface of the rotor accomodating space carrying the spiral grooves is formed with flow bores arranged around the spiral grooves at an equal spacing and communicating with the inlet channel via a fluid pool.

6. A pump as defined in claim 5 wherein the groove means further comprises equiangularly spaced spiral grooves formed on the other side surface of the discal rotor and extending radially outward from the axis of the rotor.

7. A pump as defined in claim 2 wherein the groove means comprises equiangularly spaced spiral grooves formed on one side surface of the discal rotor and extending radially outward from the axis of the rotor.

8. A pump as defined in claim 1 wherein the housing means includes a fixed shaft having an inlet end and an outlet end provided with the inlet and outlet channels respectively, the rotor is a tubular member having a central bore positioned around the fixed shaft and having an inner peripheral surface of larger diameter than the diameter of the outer peripheral surface of the fixed shaft, and the groove means comprises a helical groove or grooves formed on at least one of the surfaces of the rotor and the outer peripheral surface of the fixed shaft.

9. A pump as defined in claim 8 wherein the groove means further comprises equiangularly spaced spiral grooves formed on both lateral surfaces of the rotor and extending radially outward from the central bore of the rotor.

10. A pump as defined in claim 8 wherein the groove means further comprises equiangularly spaced herringbone grooves formed on both lateral surfaces of the rotor and extending radially outward from the central bore of the rotor.

* * * * *